United States Patent
Derangere

(10) Patent No.: US 12,512,530 B2
(45) Date of Patent: Dec. 30, 2025

(54) BATTERY ASSEMBLY FOR A MOTOR VEHICLE

(71) Applicant: PLASTIC OMNIUM CLEAN ENERGY SYSTEMS RESEARCH, Lyons (FR)

(72) Inventor: Nicolas Derangere, Brussels (BE)

(73) Assignee: PLASTIC OMNIUM CLEAN ENERGY SYSTEMS RESEARCH, Lyons (FR)

(*) Notice: Subject to any disclaimer, the term of this patent is extended or adjusted under 35 U.S.C. 154(b) by 0 days.

(21) Appl. No.: 18/836,153

(22) PCT Filed: Mar. 31, 2023

(86) PCT No.: PCT/EP2023/058547
§ 371 (c)(1),
(2) Date: Aug. 6, 2024

(87) PCT Pub. No.: WO2023/187192
PCT Pub. Date: Oct. 5, 2023

(65) Prior Publication Data
US 2025/0149675 A1    May 8, 2025

(30) Foreign Application Priority Data

Mar. 31, 2022 (FR) .................................. 2202928

(51) Int. Cl.
*H01M 10/6555*     (2014.01)
*B60L 50/64*     (2019.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
CPC ............. H01M 50/249; H01M 50/258; H01M 50/291; H01M 2220/20; H01M 10/6555;
(Continued)

(56) References Cited

U.S. PATENT DOCUMENTS

2020/0365956 A1    11/2020  Jeon et al.
2021/0143495 A1*    5/2021  Klingler .............. H01M 50/289

FOREIGN PATENT DOCUMENTS

CN    102986082 A    3/2013
CN    109935842 A    6/2019
(Continued)

OTHER PUBLICATIONS

Combined Chinese Office Action and Search Report issued Jun. 24, 2025 in Chinese Patent Application No. 202380032600.3 (with English Translation), 14 pages.
(Continued)

*Primary Examiner* — Kiran Quraishi Akhtar
(74) *Attorney, Agent, or Firm* — Oblon, McClelland, Maier & Neustadt, L.L.P.

(57) ABSTRACT

A battery assembly for a motor vehicle includes: heat exchange panels arranged one above another along a first axis, each heat exchange panel being corrugated in the form of crenelations including, in alternation and along a second axis orthogonal to the first axis, a peak and a trough, a fluid flow conduit being formed at at least one of the trough of each crenelation and the peak of each crenelation; and battery modules arranged in parallel and staggered, each battery module including at least one battery cell in pouch form, each battery module being housed in at least one crenelation so as to exchange heat with the fluid. A method for manufacturing such a battery assembly is also disclosed.

9 Claims, 5 Drawing Sheets

(51) Int. Cl.
  *H01M 10/613*    (2014.01)
  *H01M 10/625*    (2014.01)
  *H01M 10/6567*   (2014.01)
  *H01M 50/249*    (2021.01)
  *H01M 50/258*    (2021.01)
  *H01M 50/291*    (2021.01)

(52) U.S. Cl.
  CPC ..... *H01M 10/6567* (2015.04); *H01M 50/249* (2021.01); *H01M 50/258* (2021.01); *H01M 50/291* (2021.01); *B60L 50/64* (2019.02); *H01M 2220/20* (2013.01)

(58) Field of Classification Search
  CPC ............. H01M 10/613; H01M 10/625; H01M 10/6567; B60L 50/64
  See application file for complete search history.

(56) References Cited

FOREIGN PATENT DOCUMENTS

| | | |
|---|---|---|
| CN | 111512486 A | 8/2020 |
| CN | 113571805 A | 10/2021 |
| DE | 10 2017 210 343 A1 | 12/2018 |
| WO | WO 2020/179355 A1 | 9/2020 |

OTHER PUBLICATIONS

International Search Report issued Oct. 23, 2023 in PCT/EP2023/058547 filed Mar. 31, 2023, 2 pages.

\* cited by examiner

BATTERY ASSEMBLY FOR A MOTOR VEHICLE

The invention relates to a battery assembly for a motor vehicle and to a method for manufacturing such a battery assembly.

A motor vehicle battery assembly with a plurality of battery modules is already known in the prior art, for example from documents US 2021/0143495 A1, DE 10 2017 210 343 A1, WO 2020/179355 A1 and US 2020/0365956 A1. In order to allow optimal operation, the battery modules must be temperature-controlled. To achieve this, the battery assembly comprises a heat exchanger which allows the temperature of the battery modules to be controlled by means of a fluid circulating through the heat exchanger.

However, this battery assembly is relatively complex and costly to manufacture and assemble. Moreover, such a battery assembly takes up a relatively large amount of space.

There is therefore a need for a battery assembly that can accommodate a large number of battery modules while optimizing cooling and safety features such as thermal runaway protection, and to achieve this with a particularly simple design that can be easily adapted to the power requirements of the vehicle to be fitted therewith.

One object of the invention is in particular to simplify the assembly of a battery assembly comprising temperature-controlled battery modules.

To this end, one subject of the invention is a battery assembly for a motor vehicle, comprising:

heat exchange panels arranged one above another along an axis E, each heat exchange panel being corrugated in the form of crenelations comprising, in alternation and along an axis C orthogonal to the axis E, a peak and a trough, a fluid flow conduit being formed at at least one of the trough of each crenelation and the peak of each crenelation; and battery modules arranged in parallel and staggered so as to form a plurality of rows of battery modules along the axis C, which rows are formed one above the other along the axis E, each row being offset along the axis C with respect to the single adjacent row or with respect to two adjacent rows which are aligned with one another along the axis C so as to form a plurality of columns of battery modules along the axis E, each battery module comprising at least one battery cell, preferably in pouch form, each battery module being housed in at least one crenelation so as to exchange heat with the fluid.

Thus, such a battery assembly makes it possible to accommodate a large number of battery modules while optimizing cooling and safety features such as thermal runaway protection, and to achieve this with a particularly simple design that can be easily adapted to the power requirements of the vehicle to be fitted therewith.

The term "pouch battery cell" means that, in accordance with the usual meaning of this term in the field of batteries, the electrolyte and electrodes are accommodated in the internal space of the pouch battery cell, with a pouch-like envelope surrounding this internal space. The envelope includes, for example, an outer insulating layer, a metal layer and, optionally, an inner adhesive layer. The outer insulating layer prevents permeation of external moisture and/or gas, and is made of a polymeric material, for example. The metal layer improves the envelope's mechanical strength. The metal layer is, for example, formed by an alloy of iron, carbon, chromium and manganese, or by steel, or by nickel, or by a nickel alloy, or by aluminum. The electrodes protrude from the envelope in the form of conductive tabs, the envelope being sealed around these conductive tabs, which thus form the electrodes of the pouch battery cell when the pouch battery cell is assembled. Preferably, the shape of the pouch battery cell is rectangular.

According to other optional features of the battery module taken either alone or in combination:

The battery modules are rechargeable. In other words, the battery modules are of the rechargeable battery modules.

Each battery module is compressed between two heat exchange panels.

Each battery module comprises at least one prismatic battery cell. The term "prismatic battery cell" means that, in accordance with the usual meaning of this term in the field of batteries, the electrolyte and electrodes are accommodated in the internal space of the prismatic battery cell, with an envelope in the form of a rigid casing surrounding this internal space. The envelope is, for example, based on a metal, such as aluminum, or is formed by a plastic or polymer.

Each battery module comprises at least one pouch battery cell.

The heat exchange panels are based on aluminum. As a result, these panels are economical to manufacture.

The heat exchange panels are extruded shapes. As a result, these panels are particularly simple and economical to manufacture.

The heat exchange panels are formed by a plurality of drawn plates welded together, which together define the fluid flow conduits. As a result, these panels are particularly simple and economical to manufacture.

The heat exchange panels are stacked one on top of the other.

The heat exchange panels are identical. This simplifies design and reduces costs.

The fluid is a thermal control fluid, preferably liquid. Thus, for example, a coolant already used in the motor vehicle for other applications can be used, and is thus available for thermal control of the battery assembly.

Each battery module is arranged in a trough or on a peak of a crenelation.

In each heat exchange panel, the shape of the trough and/or peak of each crenelation is complementary to that of a battery module. In particular, this makes easier to position and hold the battery module in position along the axis C when assembling the battery assembly. In addition, the thermal control of the battery modules is optimized since thermal control also takes place on the side walls of each battery module.

The battery modules are identical. This simplifies design and reduces costs.

Each battery module comprises, stacked along the axis E, a first battery cell, preferably in pouch form, and a second battery cell, preferably in pouch form, a layer of compressible material being inserted between the first battery cell and the second battery cell, each battery cell comprising two cell electrodes opposite one another transversely to the axis E and to the axis C, each pair of adjacent cell electrodes being welded together to form an electrode of the battery module. Specifically, the battery cells, for example the pouch battery cells, deform by swelling and then deflating during successive charging and discharging cycles. Thus, the presence of the compressible layer compensates for the high stresses caused by the charging and discharging cycles, which would otherwise be applied to the heat exchange panels as the battery cells swell and then deflate. The term "layer of compressible material" means in particular that the layer of compressible material is more compressible along the axis E than the other elements of the battery module, namely the first battery cell and the second battery cell.

In each heat exchange panel, a fluid flow conduit is formed in the trough of each crenelation and a fluid flow conduit is formed at the peak of each crenelation. Thus, the thermal control of the battery modules is optimized, since thermal control takes place both at the trough of each crenelation and at the peak of each crenelation. Each battery module is thus necessarily surrounded by at least two fluid flow conduits.

A heat exchange plate that is corrugated in the form of crenelations comprising, in alternation and along the axis E, a peak and a trough, is inserted between a first heat exchange panel and a second heat exchange panel such that the troughs of the crenelations of the heat exchange plate are in contact and aligned with the peaks of the crenelations of the first heat exchange panel, and the peaks of the crenelations of the heat exchange plate are in contact and aligned with the troughs of the second heat exchange panel. Thus, thermal protection from thermal runaway is improved since the battery modules are insulated from one another by both the heat exchange panels and the heat exchange plate.

The crenelations of the heat exchange plate are trapezoidal in shape. Thus, a plurality of heat exchange plates can be easily stacked during storage prior to manufacture of the battery assembly. In addition, such a trapezoidal shape simplifies the insertion of the battery modules into the crenelations.

The crenelations of the heat exchange panel are trapezoidal in shape. Thus, a plurality of heat exchange panels can be easily stacked during storage prior to manufacture of the battery assembly. In addition, such a trapezoidal shape simplifies the insertion of the battery modules into the crenelations.

The crenelations of the heat exchange plate and the crenelations of the heat exchange panels have the same width along the axis C. This simplifies the relative positioning of the heat exchange plate with respect to the heat exchange panels.

The shape of the trough and/or peak of each crenelation of the heat exchange plate is complementary to that of a battery module. In particular, this makes easier to position and hold the battery module in position along the axis C when assembling the battery assembly. In addition, the thermal control of the battery modules is optimized since thermal control also takes place on the side walls of the battery modules in contact with the heat exchange plate.

The peaks and troughs of the heat exchange plate and the peaks and troughs of the heat exchange panels all have the same width along the axis C. This simplifies design and reduces costs.

In each heat exchange panel, each conduit is a through-conduit, and each n-tuple of adjacent conduits, preferably each pair of adjacent conduits, is fluidically connected by a connection coupling so as to form at least one fluid flow meander. This simplifies the manufacture of the heat exchange panels since the conduits are through-conduits. Checking for tightness is also simplified by virtue of the couplings being located at the ends of the conduits. Specifically, such an arrangement makes it possible to test the tightness of the heat exchange panels prior to the assembly thereof to form the battery assembly.

The connection coupling is made of polymer, preferably thermoplastic. Thus, the connection coupling is lightweight and simple and economical to obtain.

The connection coupling is formed in an electrically insulating material.

In each heat exchange panel, each conduit takes the form of a straight channel that opens on either side of the heat exchange panel.

The connection coupling is attached to the heat exchange panel by at least one fastening element, preferably at least one screw.

The connection coupling comprises a strip which is configured to form a bearing surface for two adjacent electrodes of battery modules of a column, the two electrodes being welded together, preferably by laser. This simplifies the manufacture of the battery assembly.

The strip is formed at one end of the connection coupling which is away from the heat exchange panel, the connection coupling comprising support tabs, the strip being supported solely by the support tabs. Thus, even if the strip is damaged when welding the two electrodes during manufacture of the battery assembly, for example due to the heat generated during welding, the risk of damaging the rest of the connection coupling, including the fluid-conducting portion thereof, is greatly reduced.

On each heat exchange panel, a fluid inlet coupling is arranged at one end of a conduit formed at one end of the heat exchange panel, and a fluid outlet coupling is arranged at one end of a conduit formed at another end of the heat exchange panel. Thus, each heat exchange panel comprises a single fluid inlet and a single fluid outlet, and a plurality of heat exchange passes formed by the conduits.

Each fluid inlet coupling is connected to a distributor manifold that has a single fluid inlet, the fluid inlet preferably being in the form of a quick-action coupling, and each fluid outlet coupling is connected to a collector manifold that has a single fluid outlet, the fluid outlet preferably being in the form of a quick-action coupling. This simplifies the fluidic connection of the battery assembly to the fluid circulation system of the motor vehicle.

The battery assembly comprises axial clamping elements which compress the heat exchange panels and the battery modules along the axis E. Thus, the integrity of the battery assembly is maintained in a simple manner.

The axial clamping elements surround the battery assembly, and are either clamping bands or clamping straps. Thus, such assembly allows the battery assembly to be easily dismantled in order to reuse or recycle the constituent components thereof.

Another subject of the invention is a motor vehicle comprising a battery assembly as described above.

Yet another subject of the invention is a method for manufacturing a battery assembly as described above, which method comprises the following steps:

manufacturing heat exchange panels, preferably by extrusion, each heat exchange panel being corrugated in the form of crenelations comprising, in alternation and along an axis C orthogonal to the axis E, a peak and a trough, a fluid flow conduit being formed at at least one from among the trough of each crenelation and the peak of each crenelation, each conduit being a through-conduit; and on each heat exchange panel, for each n-tuple of adjacent conduits, preferably for each pair of adjacent conduits, attaching a connection coupling that fluidically connects the n-tuple of adjacent conduits, preferably the pair of adjacent conduits to one another so as to form at least one fluid flow meander, the connection coupling comprising a strip which is configured to form a bearing surface;

on each heat exchange panel, arranging a fluid inlet coupling at one end of a conduit which is formed at one end of the heat exchange panel, and arranging a fluid outlet coupling at one end of a conduit which is formed at another end of the heat exchange panel, and preferably testing for fluid tightness by making fluid flow from the fluid inlet coupling to the fluid outlet coupling;

arranging the heat exchange panels one above the other along an axis E and arranging battery modules in parallel and in a staggered manner, each comprising at least one battery cell, preferably in pouch form, such that each battery module is housed in at least one crenelation so as to exchange heat with the fluid;

arranging axial clamping elements, which compress the heat exchange panels and the battery modules along the axis E;

on at least one strip, folding one over the other and then welding together two adjacent electrodes of battery modules that are arranged one above the other along the axis E.

The result is a particularly simple and economical method for manufacturing a battery assembly, allowing a compact battery assembly to be produced while ensuring excellent thermal control of the battery modules.

BRIEF DESCRIPTION OF THE FIGURES

The invention will be better understood upon reading the following description which is provided merely by way of example and with reference to the accompanying drawings, in which.

DETAILED DESCRIPTION

In all the figures, the same references relate to the same elements.

In this detailed description, the following embodiments are examples. Although the description refers to one or more embodiments, this does not mean that the features apply only to a single embodiment. Simple features of different embodiments can also be combined and/or interchanged to provide other embodiments.

Figure 1:
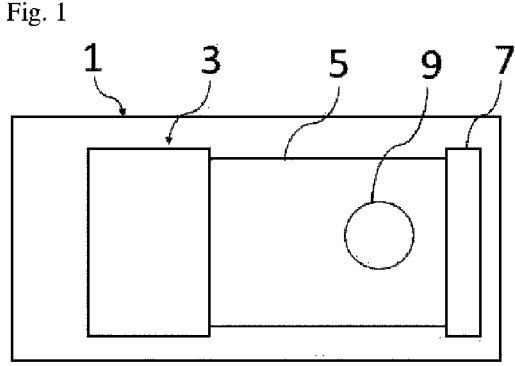
FIG. 1 is schematic view of a motor vehicle comprising a battery assembly that comprises a plurality of battery modules.

FIG. 1 schematically shows a motor vehicle 1 comprising a battery assembly 3 and a cooling circuit 5 for a thermal control fluid, preferably liquid, with a heat exchanger 7 which exchanges heat with the ambient air, for example. In this example, the motor vehicle 1 is a battery electric vehicle and thus comprises an electric motor 9 configured to drive the movement of the motor vehicle 1.

Figure 2:
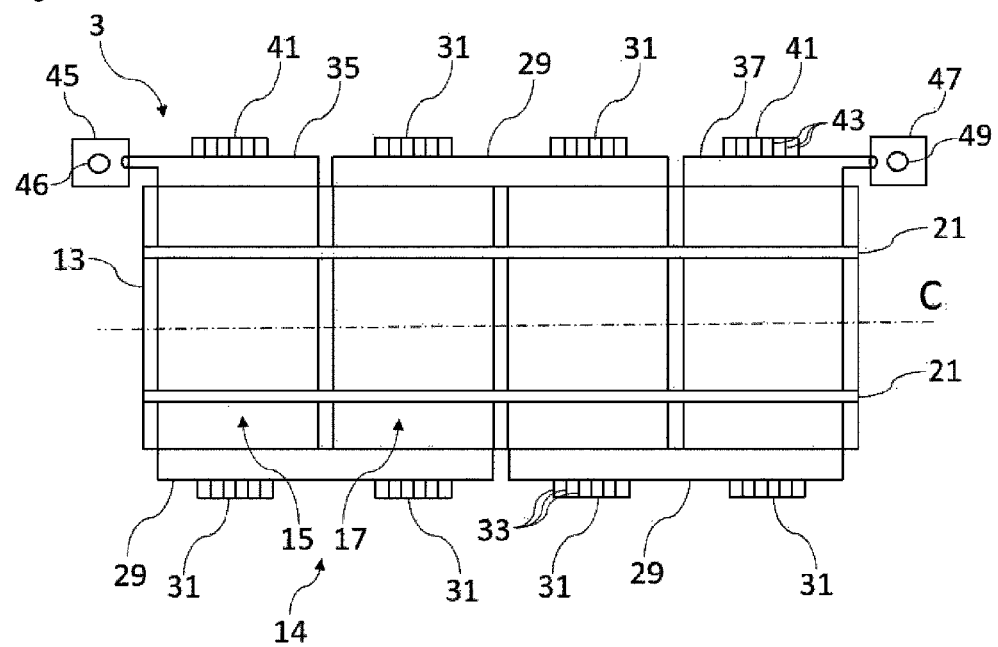
FIG. 2 is a schematic top view of a battery assembly.

The battery assembly 3, as shown in FIG. 2, comprises a plurality of battery modules 11 which are visible in particular in FIGS. 3 to 6, and which are rechargeable, and a plurality of heat exchange panels 13 according to a first variant.

Figure 5:
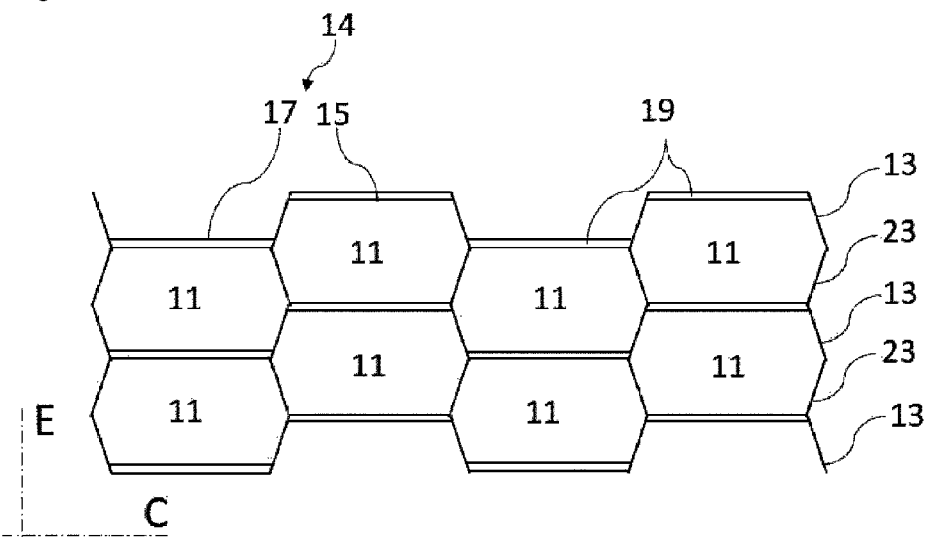
FIG. 5 is a schematic cross-sectional side view of a detail of a battery assembly according to a first variant.
Figure 6:
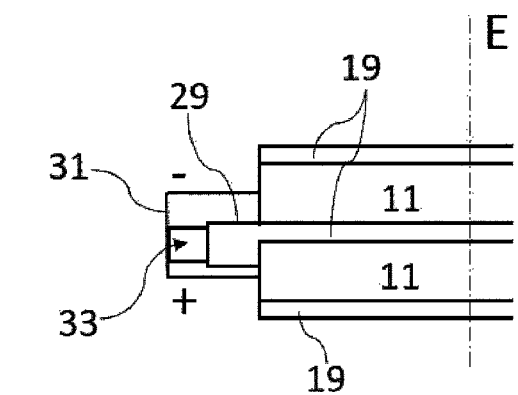
FIG. 6 is a schematic cross-sectional front view of a detail of a battery assembly according to the first variant.
Figure 10:
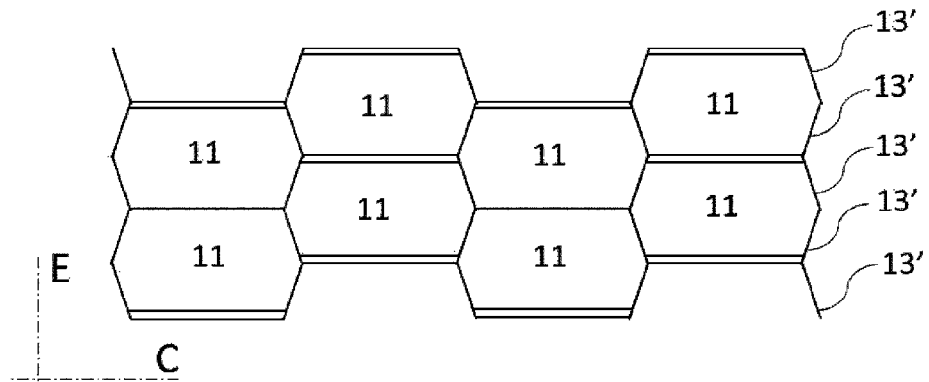
FIG. 10 is a schematic cross-sectional side view of a detail of a battery assembly according to the second variant.
Figure 11:
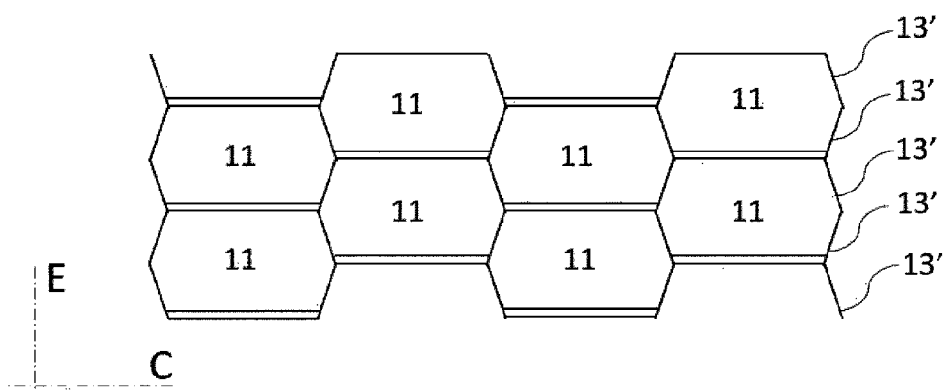
FIG. 11 is a schematic cross-sectional side view of a detail of a battery assembly according to the third variant.

According to the three variants shown in FIGS. 5, 10 and 11, the heat exchange panels 13, 13' are arranged one above the other along an axis E, each heat exchange panel 13, 13' being corrugated in the form of crenelations 14, 14' comprising, in alternation and along an axis C orthogonal to the axis E, a peak 15, 15' and a trough 17, 17'. A fluid flow conduit 19, 19' is formed at at least one from among the trough 17, 17' of each crenelation 14, 14' and the peak 15, 15' of each crenelation 14, 14'. The fluid is the thermal control fluid, preferably liquid. The heat exchange panels 13, 13' are stacked one on top of the other. In the examples shown, the heat exchange panels 13, 13' are identical. Furthermore, in each heat exchange panel 13, 13', the shape of the trough 17, 17' and/or of the peak 15, 15' of each crenelation 14, 14' is complementary to that of a battery module 11. The crenelations 14, 14' of the heat exchange panels 13, 13' have the same width along the axis C.

According to these variants, the heat exchange panels 13, 13' are based on aluminum. According to one variant, the heat exchange panels 13, 13' are extruded shapes. According to another variant, the heat exchange panels 13, 13' are formed by a plurality of drawn plates welded together, which together define the fluid flow conduits 19, 19'. The crenelations 14, 14' of the heat exchange panels 13, 13' are trapezoidal in shape, for example.

The battery modules 11 are arranged in parallel and in a staggered manner. For example, each battery module 11 delivers a voltage of around 4 volts. The battery modules 11 form a plurality of rows of battery modules 11 along the axis C, which rows are formed one above the other along the axis E, each row being offset along the axis C with respect to the single adjacent row—in other words, when the row is located at an end—or with respect to two adjacent rows which are aligned with one another along the axis C so as to form a plurality of columns of battery modules 11 along the axis E. More precisely, in this example, the battery assembly 3 comprises a plurality of rows and a plurality of columns of battery modules 11, for example two rows of four battery modules 11 as shown in FIGS. 5, 10 and 11.

Each battery module 11 comprises at least one battery cell 20, preferably in pouch form, each battery module 11 being housed in at least one crenelation 14, 14' so as to exchange heat with the fluid. Thus, battery module 11 is compressed between two heat exchange panels 13, 13'. In this example, the battery modules 11 are identical. In order to achieve compression, the battery assembly 3 comprises axial clamping elements 21 which compress the heat exchange panels 13, 13' and the battery modules 11 along the axis E. In this example, as shown in [FIG. 2], the axial clamping elements 21 surround the battery assembly 3, and are clamping bands or clamping straps. The at least one battery cell 20, which is preferably in pouch form, is a lithium-ion cell, for example.

Figures 3A, 3B:
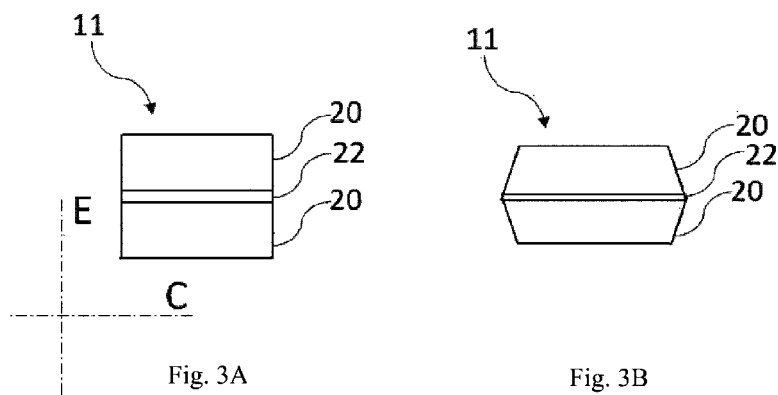
FIG. 3 is a set of schematic side views of a battery module.
Figure 4:
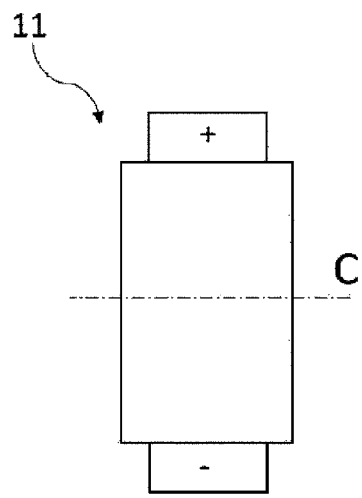
FIG. 4 is a schematic top view of a battery module.

According to a first variant of the battery modules 11, which is shown in FIGS. 3 and 4, each battery module 11 comprises, stacked along the axis E, a first battery cell 20, preferably in pouch form, and a second battery cell 20, preferably in pouch form, with a layer of compressible material 22 inserted between the first battery cell 20 and the second battery cell 20. [FIG. 3]—view on the left referenced 3A—shows an uncompressed battery module 11, and [FIG. 3]—view on the right referenced 3B—shows a compressed battery module 11, as arranged in the battery assembly 3 in the assembled state. Each battery cell 20 comprises two cell electrodes opposite one another transversely to the axis E and to the C axis C. In this example, each pair of adjacent cell electrodes are welded together to form an electrode +, − of the battery module 11.

According to a second variant (not shown) of the battery modules 11, each battery module 11 comprises a single battery cell, preferably in pouch form.

Figure 12:
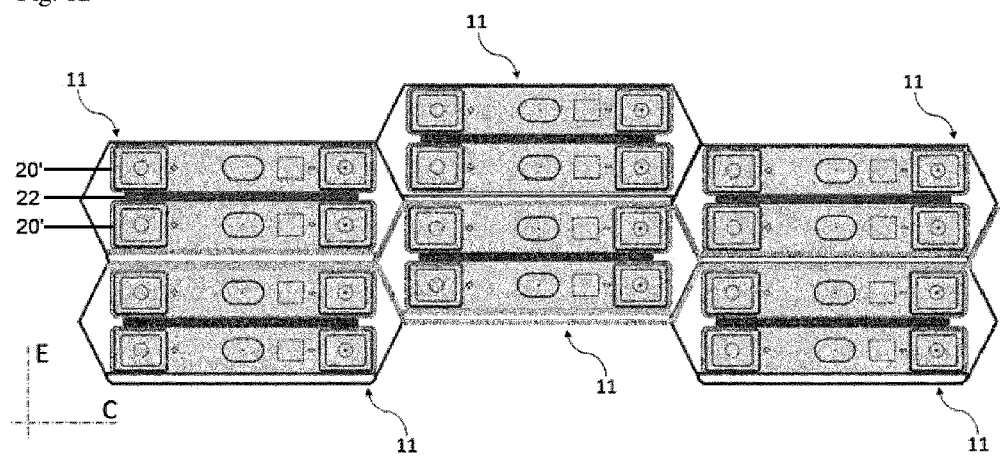
FIG. 12 is a schematic view of a battery assembly comprising battery modules according to one variant.
Figure 13:
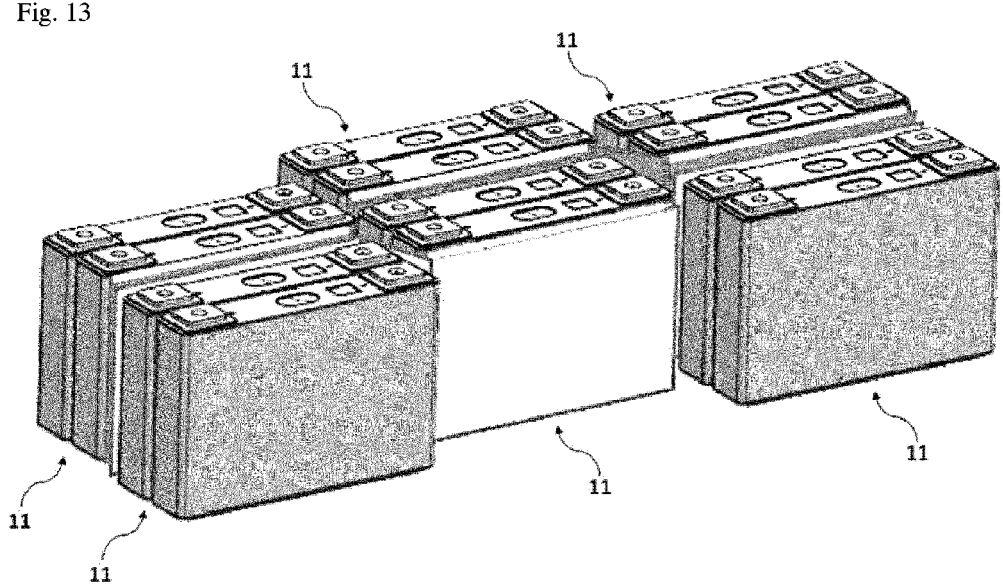
FIG. 13 is a perspective view of the battery assembly of FIG. 12.

According to a third variant of the battery modules 11, which is shown in FIGS. 12 and 13, each battery module 11 comprises, stacked along the axis E, a first prismatic battery cell 20' and a second prismatic battery cell 20', with a layer of compressible material 22 inserted between the first prismatic battery cell 20' and the second prismatic battery cell 20'.

According to a fourth variant (not shown) of the battery modules 11, each battery module 11 comprises a single prismatic battery cell.

Figure 7:
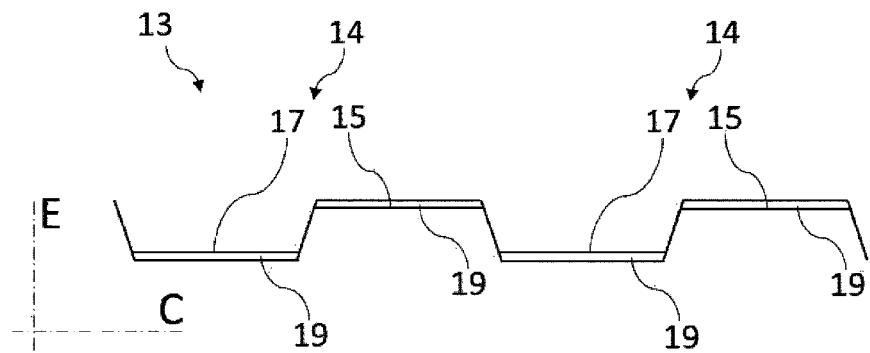
FIG. 7 is a schematic cross-sectional side view of a thermal panel according to the first variant of the battery assembly.

According to a first variant of the heat exchange panels 13 which is shown in [FIG. 5], in each heat exchange panel 13, a fluid flow conduit 19 is formed in the trough 17 of each crenelation 14 and a fluid flow conduit 19 is formed at the peak 15 of each crenelation 14. This is visible in particular in [FIG. 7], which shows a heat exchange panel 13 according to the first variant.

Figure 8:
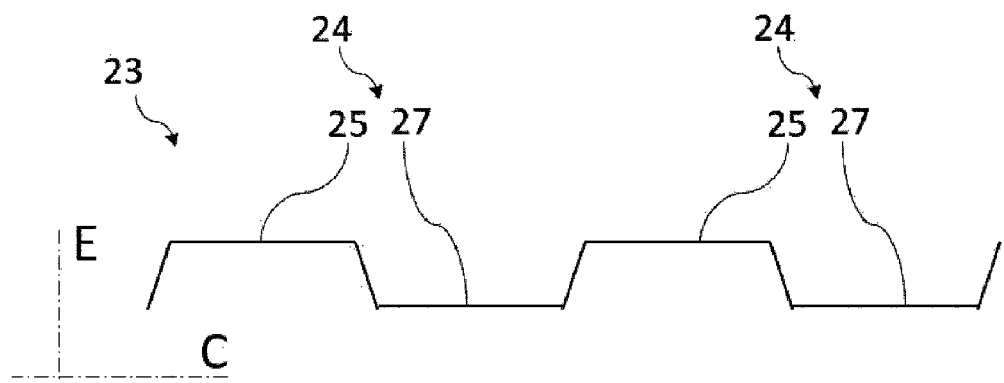
FIG. 8 is a schematic cross-sectional side view of a plate according to the first variant of the battery assembly.

Furthermore, a heat exchange plate 23 that is corrugated in the form of crenelations 24 comprising, in alternation and along the axis E, a peak 25 and a trough 27, is inserted between a first heat exchange panel 13 and a second heat exchange panel 13 such that the troughs 27 of the crenelations 24 of the heat exchange plate 23 are in contact and aligned with the peaks 15 of the crenelations 14 of the first heat exchange panel 13, and the peaks 25 of the crenelations 24 of the heat exchange plate 23 are in contact and aligned with the troughs 17 of the second heat exchange panel 13. [FIG. 8] schematically shows such a heat exchange plate 23.

In this variant, the crenelations 24 of the heat exchange plate 23 and the crenelations 14 of the heat exchange panels 13 have the same width along the axis C. The shape of the trough 27 and/or the peak 25 of each crenelation 24 of the heat exchange plate 23 is complementary to that of a battery module 11.

This pattern, resulting from the stacking of a first heat exchange panel 13, a heat exchange plate 23, and a second heat exchange panel 13, can be repeated. The crenelations 24 of the heat exchange plate 23 are trapezoidal in shape, for example.

In each heat exchange panel 13, each conduit 19 is a through-conduit. More precisely, each conduit 19 takes the form of a straight channel that opens on either side of the heat exchange panel 13.

Each n-tuple of adjacent conduits 19, preferably each pair of adjacent conduits 19 as shown in [FIG. 2], is fluidically connected by a connection coupling 29 so as to form at least one fluid flow meander. The connection coupling 29 is made of polymer, preferably thermoplastic. The connection coupling 29 is also formed in an electrically insulating material. The connection coupling 19 is attached to the heat exchange panel 13 by at least one fastening element, preferably at least one screw. To allow such attachment, the heat exchange panel 13 comprises, for example, a through-hole (not shown) formed in the connecting region between the peak 15 and the bottom 17 of each crenelation 14.

The connection coupling 29 comprises a strip 31 which is configured to form a bearing surface for two adjacent electrodes +, − of battery modules 11 of a column, the two electrodes +, − being welded together, preferably by laser.

As shown in [FIG. 2], the strip 31 is formed at one end of the connection coupling 29 which is away from the heat exchange panel 13, the connection coupling 29 comprising support tabs 33, the strip 31 being supported solely by the support tabs 33.

Furthermore, on each heat exchange panel 13, a fluid inlet coupling 35 is arranged at one end of a conduit 19 formed at one end of the heat exchange panel 13, and a fluid outlet coupling 37 is arranged at one end of a conduit 19 formed at another end of the heat exchange panel 13. In this example, the fluid inlet coupling 35 and the fluid outlet coupling 37 each comprise a strip 41 which is configured to form a bearing surface for two adjacent electrodes +, − of battery modules 11 of a column. The two electrodes +, − are welded together, preferably by laser. As shown in [FIG. 2], the strip 41 is formed at one end of the fluid inlet coupling 35 or of the fluid outlet coupling 37, which is away from heat exchange panel 13. The fluid inlet coupling 35 or the fluid outlet coupling 37 comprise support tabs 43, the strip 41 being supported solely by the support tabs 43. Each fluid inlet coupling 35 is connected to a distributor manifold 45 that has a single fluid inlet 46, the fluid inlet 46 preferably being in the form of a quick-action coupling. Each fluid outlet coupling 37 is connected to a collector manifold 47 that has a single fluid outlet 49, the fluid outlet 49 preferably being in the form of a quick-action coupling. The fluid inlet 46 and the fluid outlet 49 are thus configured to be fluidically connected to the cooling circuit 5 of the motor vehicle 1.

Figure 9:
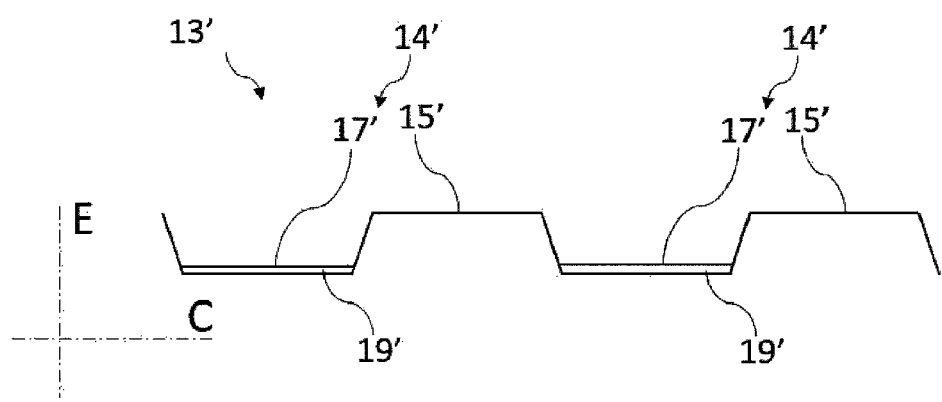
FIG. 9 is a schematic cross-sectional side view of a thermal panel according to second and third variants of the battery assembly.

According to one variant of the heat exchange panels 13' which is shown in [FIG. 9], in each heat exchange panel 13', a fluid flow conduit 19' is formed in the trough 17' of each crenelation 14' or a fluid flow conduit 19' is formed at the peak 15' of each crenelation 14'. Thus, a battery assembly 3 according to a second variant comprises a plurality of heat exchange panels 13' of the type shown in [FIG. 9], which are arranged alternately rotated by half a turn about the axis E and/or rotated by half a turn about the axis C, which are stacked consecutively in the following pattern, as shown in [FIG. 10]: the first in the position shown in [FIG. 9], the second rotated by half a turn about the axis E, the third rotated by half a turn about an axis orthogonal to the plane formed by the axes E and C, the fourth rotated by half a turn about the axis C. This pattern can be repeated multiple times in whole or in part, for example at the ends along the axis E.

According to a third variant of the battery assembly 3, the battery assembly 3 comprises a plurality of heat exchange panels 13' of the type shown in [FIG. 9], which are stacked consecutively in the following pattern, as shown in [FIG. 11]: the first in the position shown in [FIG. 9], the second rotated by half a turn about the axis E. This pattern can be repeated multiple times in whole or in part, for example at the ends along the axis E.

An example of a method for manufacturing a battery assembly 3 as defined above is described below. Such a manufacturing method comprises the following steps:

- manufacturing heat exchange panels 13, preferably by extrusion, each heat exchange panel 13 being corrugated in the form of crenelations 14 comprising, in alternation and along an axis C orthogonal to the axis E, a peak 15 and a trough 17, a fluid flow conduit 19 being formed at at least one from among the trough 17 of each crenelation 14 and the peak 15 of each crenelation 14, each conduit 19 being a through-conduit; and
- on each heat exchange panel 13, for each n-tuple of adjacent conduits 19, preferably for each pair of adjacent conduits 19, attaching a connection coupling 29 that fluidically connects the n-tuple of adjacent conduits 19, preferably the pair of adjacent conduits 19 to one another so as to form at least one fluid flow meander, the connection coupling 29 comprising a strip 31 which is configured to form a bearing surface;
- on each heat exchange panel 13, arranging a fluid inlet coupling 35 at one end of a conduit 19 which is formed at one end of the heat exchange panel 13, and arranging a fluid outlet coupling 37 at one end of a conduit 19 which is formed at another end of the heat exchange panel 13, and preferably testing for fluid tightness by making fluid flow from the fluid inlet coupling 35 to the fluid outlet coupling 37;
- arranging the heat exchange panels 13 one above the other along an axis E and arranging battery modules 11 in parallel and in a staggered manner, such that each battery module 11 is housed in at least one crenelation 14 so as to exchange heat with the fluid;
- arranging axial clamping elements 21, which compress the heat exchange panels 13 and the battery modules 11 along the axis E;
- on at least one strip 31, folding one over the other and then welding together two adjacent electrodes +, − of battery modules 11 that are arranged one above the other along the axis E.

The invention is not limited to the embodiments presented, and other embodiments will become clearly apparent to the person skilled in the art. In particular, it is possible to produce a battery pack comprising a plurality of battery assemblies 3 arranged parallel to one another and electrically connected to one another by busbars.

LIST OF REFERENCES

1: motor vehicle
3: battery assembly
5: cooling circuit
7: heat exchanger
9: electric motor
11: battery module
13, 13': heat exchange panel
14, 14': crenelation
15, 15': peak
17, 17': trough
19, 19': conduit
20: battery cell
20': prismatic battery cell
21: axial clamping element
22: layer of compressible material
23: heat exchange plate
24: crenelation
25: peak
27: trough
29: connection coupling
31: strip
33: support tab
35: fluid inlet coupling
37: fluid outlet coupling
41: strip
43: support tab
45: distributor manifold
46: fluid inlet
47: collector manifold
49: fluid outlet
E: axis
C: axis
−: electrode
+: electrode

The invention claimed is:

1. A battery assembly for a motor vehicle comprising:
heat exchange panels arranged one above another along an axis E, each heat exchange panel being corrugated in the form of crenelations comprising, in alternation and along an axis C orthogonal to the axis E, a peak and a trough, a fluid flow conduit being formed at at least one from among the trough of each crenelation and the peak of each crenelation;
battery modules arranged in parallel and staggered so as to form a plurality of rows of battery modules along the axis C, which rows are formed one above the other along the axis E, each row being offset along the axis C with respect to the single adjacent row or with respect to two adjacent rows which are aligned with one another along the axis C so as to form a plurality of columns of battery modules along the axis E, each battery module comprising at least one battery cell in pouch form, each battery module being housed in at least one crenelation so as to exchange heat with the fluid, and
wherein, in each heat exchange panel, a fluid flow conduit is formed in the trough of each crenelation and a fluid flow conduit is formed at the peak of each crenelation.

2. The battery assembly as claimed in claim 1, wherein a heat exchange plate that is corrugated in the form of crenelations comprising, in alternation and along the axis E, a peak and a trough, is inserted between a first heat exchange panel and a second heat exchange panel such that the troughs of the crenelations of the heat exchange plate are in contact and aligned with the peaks of the crenelations of the first heat exchange panel, and the peaks of the crenelations of the heat exchange plate are in contact and aligned with the troughs of the second heat exchange panel.

3. The battery assembly as claimed in claim 1, wherein, in each heat exchange panel:
each conduit is a through-conduit; and
each n-tuple of adjacent conduits is fluidically connected by a connection coupling so as to form at least one fluid flow meander.

4. The battery assembly as claimed in claim 3, wherein the connection coupling is made of polymer.

5. The battery assembly as claimed in claim 3, wherein the connection coupling comprises a strip which is configured to form a bearing surface for two adjacent electrodes of battery modules of a column, the two electrodes being welded together.

6. The battery assembly as claimed in claim 5, wherein the strip is formed at one end of the connection coupling which is away from the heat exchange panel, the connection coupling comprising support tabs, the strip being supported solely by the support tabs.

7. The battery assembly as claimed in claim 1, wherein, on each heat exchange panel, a fluid inlet coupling is arranged at one end of a conduit formed at one end of the heat exchange panel, and a fluid outlet coupling is arranged at one end of a conduit formed at another end of the heat exchange panel.

8. The battery assembly as claimed in claim 7, wherein each fluid inlet coupling is connected to a distributor manifold that has a single fluid inlet, and each fluid outlet coupling is connected to a collector manifold that has a single fluid outlet.

9. A method for manufacturing a battery assembly as claimed in claim 1, the method comprising:

manufacturing heat exchange panels, each heat exchange panel being corrugated in the form of crenelations comprising, in alternation and along the axis C orthogonal to the axis E, a peak and a trough, a fluid flow conduit being formed at at least one from among the trough of each crenelation and the peak of each crenelation, each conduit being a through-conduit; and on each heat exchange panel, for each n-tuple of adjacent conduits, attaching a connection coupling that fluidically connects the n-tuple of adjacent conduits to one another so as to form at least one fluid flow meander, the connection coupling comprising a strip which is configured to form a bearing surface;

on each heat exchange panel, arranging a fluid inlet coupling at one end of a conduit which is formed at one end of the heat exchange panel, and arranging a fluid outlet coupling at one end of a conduit which is formed at another end of the heat exchange panel, and testing for fluid tightness by making fluid flow from the fluid inlet coupling to the fluid outlet coupling;

arranging the heat exchange panels one above the other along the axis E and arranging battery modules in parallel and in a staggered manner, each comprising at least one battery cell in pouch form, such that each battery module is housed in at least one crenelation so as to exchange heat with the fluid;

arranging axial clamping elements, which compress the heat exchange panels and the battery modules along the axis E; and on at least one strip, folding one over the other and then welding together two adjacent electrodes of battery modules that are arranged one above the other along the axis E.

* * * * *